(12) United States Patent
Hu et al.

(10) Patent No.: US 12,245,143 B2
(45) Date of Patent: Mar. 4, 2025

(54) DWELLING CELL METHOD, TERMINAL, AND NON-TRANSITORY STORAGE MEDIUM

(71) Applicant: GUANGDONG OPPO MOBILE TELECOMMUNICATIONS CORP., LTD., Guangdong (CN)

(72) Inventors: Wujun Hu, Guangdong (CN); Lihai Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 360 days.

(21) Appl. No.: 17/863,226

(22) Filed: Jul. 12, 2022

(65) Prior Publication Data

US 2022/0346001 A1    Oct. 27, 2022

Related U.S. Application Data

(63) Continuation of application No. PCT/CN2021/070487, filed on Jan. 6, 2021.

(30) Foreign Application Priority Data

Jan. 13, 2020    (CN) .......................... 202010033781.X

(51) Int. Cl.
*H04W 48/20* (2009.01)
*H04W 48/16* (2009.01)

(52) U.S. Cl.
CPC .......... *H04W 48/20* (2013.01); *H04W 48/16* (2013.01)

(58) Field of Classification Search
CPC .............................. H04W 48/20; H04W 48/18
(Continued)

(56) References Cited

U.S. PATENT DOCUMENTS

2010/0216469 A1\* 8/2010 Yi .......................... H04W 48/20
455/435.3
2018/0324888 A1    11/2018 Shi et al.
(Continued)

FOREIGN PATENT DOCUMENTS

CN          101547484 A       9/2009
CN          101984711 A       3/2011
(Continued)

OTHER PUBLICATIONS

International search report and Written Opinion with English Translation for PCT/CN2021/070487 mailed Mar. 26, 2021 (15 pages).
(Continued)

*Primary Examiner* — Ted M Wang
(74) *Attorney, Agent, or Firm* — Young Basile Hanlon & MacFarlane, P.C.

(57) ABSTRACT

A cell dwelling method, a terminal, and a non-transitory storage medium. The method includes searching for frequency points of pre-stored cells, and determining first-type cells from the pre-stored cells, the pre-stored cells and the first-type cells being preset anchor cells configured to access a first network, and the first-type cells being the preset anchor cells determined by performing a frequency-scanning process for the pre-stored cells; performing another frequency-scanning process and obtaining frequency-scanning cells, and adding the frequency-scanning cells to a list of candidate cells; the frequency-scanning cells including the first-type cells, and the frequency-scanning cells in the list of the candidate cells being sorted based on a preset sorting rule; and increasing priorities of the first-type cells in the list of the candidate cells, selecting a target cell of the first-type cells from the list of the candidate cells based on the priorities, and dwelling on the target cell.

14 Claims, 3 Drawing Sheets

(58) Field of Classification Search
USPC .......................................................... 455/434
See application file for complete search history.

(56) References Cited

U.S. PATENT DOCUMENTS

| | | | |
|---|---|---|---|
| 2019/0174341 A1* | 6/2019 | Chincholi | ............ H04B 17/336 |
| 2019/0349825 A1 | 11/2019 | Tseng et al. | |
| 2019/0373523 A1 | 12/2019 | Panchal et al. | |

FOREIGN PATENT DOCUMENTS

| | | | |
|---|---|---|---|
| CN | 104244372 | A | 12/2014 |
| CN | 104349301 | A | 2/2015 |
| CN | 104509167 | A | 4/2015 |
| CN | 104936261 | A | 9/2015 |
| CN | 108235408 | A | 6/2018 |
| CN | 108377548 | A | 8/2018 |
| CN | 109787643 | A | 5/2019 |
| CN | 110324822 | A | 10/2019 |
| CN | 110381533 | A | 10/2019 |
| CN | 110392437 | A | 10/2019 |
| CN | 111246541 | A | 6/2020 |
| EP | 2624630 | A1 | 8/2013 |
| EP | 3528543 | A1 | 8/2019 |
| WO | 2004017648 | A1 | 2/2004 |
| WO | 2019058092 | A1 | 3/2019 |

OTHER PUBLICATIONS

Chinese first office action with English Translation for CN application No. 202010033781.X mailed Feb. 1, 2021 (11 pages).
Chinese Notification to Grant Patent Right with English Translation for CN application No. 202010033781.X mailed Aug. 13, 2021 (6 pages).
Extended European Search Report for EP Application 21741472.1 mailed Dec. 16, 2022. (11 pages).

* cited by examiner searching, by the terminal, for frequency points of pre-stored cells, and determining first-type cells from the pre-stored cells, wherein the pre-stored cells and the first-type cells are preset anchor cells configured to access a first network, and the first-type cells are the preset anchor cells determined by performing a frequency-scanning process for the pre-stored cells. — S101 performing, by the terminal, another frequency-scanning process and obtaining frequency-scanning cells, and adding the frequency-scanning cells to a list of candidate cells; wherein the frequency-scanning cells comprises the first-type cells, and the frequency-scanning cells in the list of the candidate cells are sorted based on a preset sorting rule. — S102 increasing, by the terminal, priorities of the first-type cells in the list of the candidate cells, selecting a target cell of the first-type cells from the list of the candidate cells based on the priorities, and dwelling on the target cell. — S103

FIG. 1

DWELLING CELL METHOD, TERMINAL, AND NON-TRANSITORY STORAGE MEDIUM

CROSS-REFERENCE TO RELATED APPLICATION(S)

The present disclosure is a continuation-application of International (PCT) Patent Application No. PCT/CN2021/070487, filed on Jan. 6, 2021, which claims foreign priority of Chinese Patent Application No. 202010033781.X, filed on Jan. 13, 2020, the contents of both of which are hereby incorporated by reference in their entireties.

TECHNICAL FIELD

The present disclosure relates to a field of communications, and in particular to a cell dwelling method, a terminal, and a non-transitory storage medium.

BACKGROUND

For a deployment of the 5G (5$^{th}$ Generation) mobile communication technology network, a means of a Non Stand Alone (NSA) networking and a means of a Stand Alone (SA) networking may be used for the deployment. The means of the NSA may be that a control plane is independently deployed by the 4G (4$^{th}$ Generation) mobile communication technology (that is, a control signaling is loaded by the 4G), or a user plane is deployed by the 4G and the 5G together (that is, data of the user plane is loaded by the 4G and the 5G) or by the 5G independently (that is, the data of the user plane is only loaded by the 5G). The means of the NSA may reduce a cost of deploying a 5G network and increase a speed of deploying the 5G network. Therefore, at a current stage, 5G operators basically deploy the 5G network by means of the NSA.

In the related art, when a terminal supporting NSA faces a NSA anchor cell and a LTE cell starting up simultaneously, the terminal may prioritize to dwell on the LTE cell, and not dwell on the NSA anchor cell until fail to dwell all the LTE cells, such that a flexibility of dwelling on cells may be reduced.

SUMMARY

A cell dwelling method, a terminal, and non-transitory storage medium are provided in the embodiments.

The technical solution of the present disclosure may be achieved as the following.

The cell dwelling method is provided in the embodiments of the present disclosure and includes searching for frequency points of pre-stored cells, and determining first-type cells from the pre-stored cells, wherein the pre-stored cells and the first-type cells are preset anchor cells configured to access a first network, and the first-type cells are the preset anchor cells determined by performing a frequency-scanning process for the pre-stored cells; performing another frequency-scanning process and obtaining frequency-scanning cells, and adding the frequency-scanning cells to a list of candidate cells; wherein the frequency-scanning cells comprises the first-type cells, and the frequency-scanning cells in the list of the candidate cells are sorted based on a preset sorting rule; and increasing priorities of the first-type cells in the list of the candidate cells, selecting a target cell of the first-type cells from the list of the candidate cells based on the priorities, and dwelling on the target cell.

In some embodiments, the performing another frequency-scanning process and obtaining frequency-scanning cells, includes performing the frequency-scanning process and receiving a system message of a first cell, and parsing the system message; wherein the first cell is any one of the frequency-scanning cells; adding the first cell to the first-type cells in response to a target field being parsed from the system message, wherein the target field is configured to indicate an anchor cell accessing the first network; determining the first cell is of second-type cells in response to the target field being not parsed from the system message, wherein the second-type cells are cells configured to access networks different from the first network; and combining the first-type cells and second-type cells to be the frequency-scanning cells.

In some embodiments, before searching for frequency points of pre-stored cells, the method further includes acquiring pre-configured anchor cells for accessing the first network and frequency-point information of the pre-configured anchor cells; and adding the pre-configured anchor cells and the frequency-point information of the pre-configured anchor cells to the pre-stored cells.

In some embodiments, before searching for frequency points of pre-stored cells, the method further includes acquiring historical anchor cells which have historically accessed the first network and frequency-point information of the historical anchor cells; and adding the historical anchor cells and the frequency-point information of the historical anchor cells to the pre-stored cells.

In some embodiments, the searching for frequency points of pre-stored cells includes searching for the frequency points of the pre-stored cells according to a preset frequency-scanning sequence.

In some embodiments, the performing another frequency-scanning process and obtaining frequency-scanning cells, includes configuring frequency-band information corresponding to the first network; and performing the frequency-scanning process according to frequency-point information corresponding to the first network, and obtaining the frequency-scanning cells.

In some embodiments, the selecting a target cell of the first-type cells from the list of the candidate cells based on the priorities, and dwelling on the target cell, includes sorting the frequency-scanning cells in the list of the candidate cells based on the priorities of the first-type cells, and obtaining a sorted list of the candidate cells; and selecting the target cell having a high priority from the sorted list of the candidate cells, and dwelling on the target cell.

In some embodiments, after selecting a target cell of the first-type cells from the list of the candidate cells based on the priorities, and dwelling on the target cell, the method includes updating the pre-stored cells by the target cell.

A terminal is provided in the embodiments of the present disclosure and includes a frequency-scanning part configured to search for frequency points of pre-stored cells, and determine first-type cells from the pre-stored cells, wherein the pre-stored cells and the first-type cells are preset anchor cells configured to access a first network, and the first-type cells are the preset anchor cells determined by performing a frequency-scanning process for the pre-stored cells; and perform another frequency-scanning process and obtain frequency-scanning cells, and add the frequency-scanning cells to a list of candidate cells; wherein the frequency-scanning cells comprise the first-type cells, and the frequency-scanning cells in the list of the candidate cells are sorted based on a preset sorting rule; and a cell-dwelling part configured to increase priorities of the first-type cells in the list of the candidate cells, select a target cell of the first-type cells from the list of the candidate cells based on the priorities, and dwell on the target cell.

Another terminal is provided in the embodiments of the present disclosure and includes a processor, a memory, and a communication bus. When executing operating programs stored in the memory, the processor is configured to implement the above method.

The non-transitory storage medium applied for a terminal is provided in the embodiments of the present disclosure, storing computer programs, wherein when the computer programs are executed by a processor, the processor is caused to implement the above method.

BRIEF DESCRIPTION OF DRAWINGS

FIG. 1 is a schematic view of a flowchart of a cell dwelling method according to some embodiments of the present disclosure.

DETAILED DESCRIPTION

Figure 2:
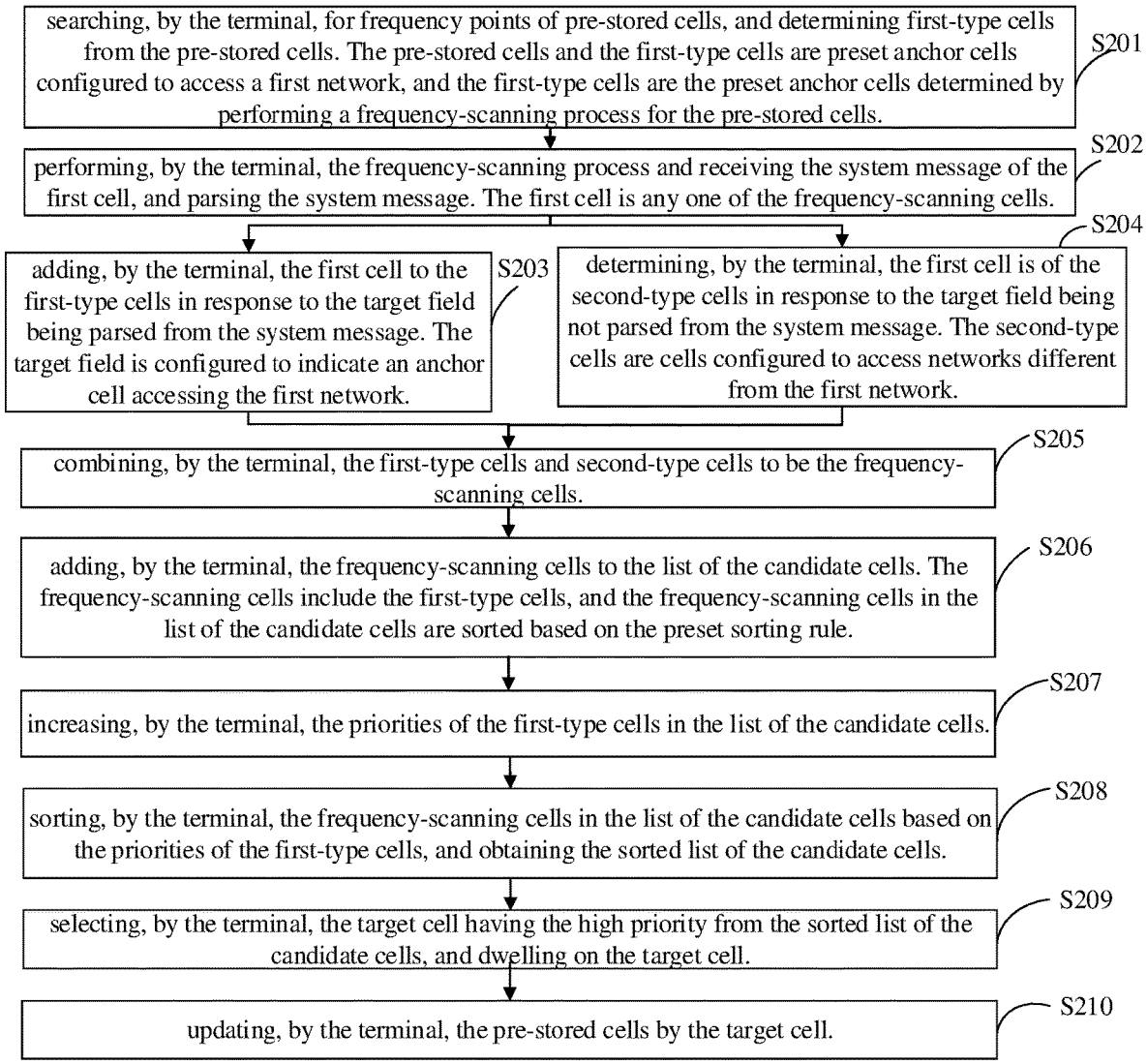
FIG. 2 is a schematic view of another flowchart of the cell dwelling method according to some embodiments of the present disclosure.

It should be understood that specific embodiments described herein are merely for illustrating the present disclosure, and not intended to limit the present disclosure.

A First Embodiment

A cell dwelling method is provided in some embodiments of the present disclosure, as shown in FIG. 1, and the method may include the following.

At block S101, searching, by the terminal, for frequency points of pre-stored cells, and determining first-type cells from the pre-stored cells, wherein the pre-stored cells and the first-type cells are preset anchor cells configured to access a first network, and the first-type cells are the preset anchor cells determined by performing a frequency-scanning process for the pre-stored cells.

The cell dwelling method provided in some embodiments of the present disclosure is applicable for a scenario in which the terminal performs the frequency-scanning process and prioritizes a NSA anchor cell to dwell on during an initial access.

In the embodiments of the present disclosure, the terminal may pre-store the pre-stored cells configured to access the first network and the frequency points of the pre-stored cells. When the terminal determines that the initial access is required, a RRC (Radio Resource Control) is configured to perform a first frequency-scanning process. At a stage of a system scan, the terminal may prioritize to search for the frequency points of the pre-stored cells. The pre-stored cells may be stored in an EFS (Encrypting File System) of the terminal. When the terminal searches for and finds a frequency point of a pre-stored cell, it is indicated that the pre-stored cell exists in a location range in which the terminal is located. When the terminal fails to search for and find the frequency point of the pre-stored cell, it is indicated that the pre-stored cell does not exist in the location range in which the terminal is located. In this case, the terminal may be configured to remove the pre-stored cell during the first frequency-scanning process.

Scenarios of the initial access may include but are not limited to the following scenarios: a scenario in which a SIM card is insert into the terminal and the terminal is configured to perform a power-on operation, a scenario in which the terminal switches from an airplane mode to a working mode, a scenario in which the terminal is in a RLF (Radio Link Failure) state, and the like.

In the embodiments of the present disclosure, the first network may be the 5G network, and the pre-stored cells may be NSA anchor cells.

In the embodiments of the present disclosure, the terminal may be configured to acquire pre-configured anchor cells for accessing the first network and frequency-point information of the pre-configured anchor cells; and add the pre-configured anchor cells and the frequency-point information of the pre-configured anchor cells to the pre-stored cells.

Specifically, the terminal may acquire the frequency points of pre-configured NSA anchor cells (from a prefer_nsa_list). These frequency points of the pre-configured NSA anchor cells may be known frequency-point information of the NSA anchor cells of which signal strengths rank the top n obtained by the terminal from the operators or other terminals. Subsequently, the terminal may pre-embed the pre-configured NSA anchor cells and the frequency points of the pre-configured NSA anchor cells to the EFS of the terminal.

In the embodiments of the present disclosure, the terminal may be configured to acquire historical anchor cells which have historically accessed the first network and frequency-point information of the historical anchor cells; and add the historical anchor cells and the frequency-point information of the historical anchor cells to the pre-stored cells.

Specifically, the terminal may be configured to acquire historical NSA anchor cells which have been dwelled on by the terminal and loaded and activated by a NR (New Radio), and the frequency points of the historical anchor cells (ACQ_DB(NSA). Subsequently, the terminal may store the historical NSA anchor cells and the frequency points of the historical anchor cells in the EFS of the terminal.

In the embodiments of the present disclosure, since acquisition types of cells stored in the pre-stored cells are different, the terminal may set a preset frequency-scanning sequence for the cells having different acquisition types. During a frequency-scanning process of a LTE RRC, the terminal may search for the frequency points of the pre-stored cells according to the preset frequency-scanning sequence.

In an embodiment, when the pre-configured anchor cells and the historical anchor cells are stored in the pre-stored cells, the terminal may set the preset frequency-scanning sequence to search for the frequency points of the pre-configured anchor cells first and then search for the frequency points of the historical anchor cells. The preset frequency-scanning sequence above is only an embodiment. The frequency-scanning sequence for the pre-stored cells may be reset based on actual situations, and a specific selecting process based on the actual situations will not be specifically limited in the embodiments of the present disclosure.

Specifically, the terminal may set the preset frequency-scanning sequence to prioritize to search for the frequency points of the NSA anchor cells. The frequency-scanning sequence may be as ACQ_DB (NSA), prefer_nsa_list, ACQ_DB (LTE) (frequency points of historical LTE cells), prefer_freq_list (LTE) (pre-embedded frequency points of the LTE cells).

At block S102, performing, by the terminal, another frequency-scanning process and obtaining frequency-scanning cells, and adding the frequency-scanning cells to a list of candidate cells; wherein the frequency-scanning cells comprises the first-type cells, and the frequency-scanning cells in the list of the candidate cells are sorted based on a preset sorting rule.

After determining the first-type cells from the pre-stored cells, the terminal may continue to perform the frequency-scanning process to obtain the frequency-scanning cells, and add the frequency-scanning cells to the list of the candidate cells. In some embodiments, the frequency-scanning cells may include the first-type cells, and the frequency-scanning cells in the list of the candidate cells may be sorted based on the preset sorting rule.

In the embodiments of the present disclosure, during the frequency-scanning process, the terminal may perform the frequency-scanning process and receive a system message of a first cell, and parse the system message. In some embodiments, the first cell is any one of the frequency-scanning cells. When parsing a target field from the system message, the terminal may add the first cell to the first-type cells. In some embodiments, the target field is configured to indicate an anchor cell accessing the first network. When not parsing the target field from the system message, the terminal may determine the first cell is of second-type cells. In some embodiments, the second-type cells are cells configured to access networks different from the first network. The terminal may combine the first-type cells and the second-type cells to be the frequency-scanning cells. In this way, the terminal completes a process of performing the frequency-scanning process and obtaining the frequency-scanning cells. In actual applications, the frequency-scanning cells may at least include the NSA anchor cells and the LTE cells.

In the embodiments of the present disclosure, at a frequency-scanning stage of the RRC, each time the terminal searches for and finds a frequency point of a cell, the terminal may perform the frequency-scanning process and receive the system message of the cell, and parse the system message.

In the actual applications, when the system message is SIB2, a base station may broadcast the SIB2 to the terminal. The terminal may perform the frequency-scanning process and receive the SIB2, and parse fields contained in the system message.

In the embodiments of the present disclosure, the target field may be upperLayerIndication-r15, which is a field extended from the LTE cell for a form of the NSA networking and configured to indicate whether the cell is the NSA anchor cell supporting 5G. The terminal may parse the SIB2. When parsing the upperLayerindication-r15 from the SIB2, the terminal determines that the first cell is an NSA anchor cell. In this case, the terminal may add the first cell to the first-type cells.

In the embodiments of the present disclosure, the terminal may configure frequency-band information corresponding to the first network. In a process that the terminal performs the frequency-scanning process and obtains the frequency-scanning cells, the terminal may perform the frequency-scanning process according to frequency-point information corresponding to the first network, and obtain the frequency-scanning cells.

In the embodiments of the present disclosure, the terminal may pre-configure the frequency-band information corresponding to the first network (5G). At the frequency-scanning stage of the RRC, it may be limited to perform the frequency-scanning process according to the frequency-point information corresponding to the first network, and obtain the frequency-scanning cells. In this way, an efficiency and an accuracy of the frequency-scanning process may be improved.

At block S103, increasing, by the terminal, priorities of the first-type cells in the list of the candidate cells, selecting a target cell of the first-type cells from the list of the candidate cells based on the priorities, and dwelling on the target cell.

After the terminal obtains the list of the candidate cells, the terminal may increase the priorities of the first-type cells in the list of the candidate cells, and select the target cell of the first-type cells from the list of the candidate cells based on the priorities, and dwell on the target cell.

In the embodiments of the present disclosure, the terminal may sort the frequency-scanning cells in the list of the candidate cells based on the priorities of the first-type cells, and obtain a sorted list of the candidate cells. Subsequently, the terminal may select the target cell having a high priority from the sorted list of the candidate cells, and dwell on the target cell.

In the embodiments of the present disclosure, after completing the frequency-scanning process of the RRC, the terminal may sort the frequency-scanning cells obtained after the frequency-scanning process based on the preset sorting rule and obtain the list of the candidate cells. Subsequently, the terminal may increase the priorities of the first-type cells in the list of the candidate cells and sort the frequency-scanning cells in the list of the candidate cells based on the priorities of the first-type cells, and obtain the sorted list of the candidate cells.

In an embodiment, the preset sorting rule may be based on the signal strengths. The terminal may sort a set of candidate cells based on a descending sequence of the signal strengths and obtain the list of the candidate cells.

In some embodiments, the signal strengths may include RSRP (Reference Signal Receiving Power) strength, LTE RSRQ (Reference Signal Receiving Quality), and SINR (Signal to Interference plus Noise Ratio), etc., which may be specifically selected based on the actual situations, and not specifically limited in the embodiments of the present disclosure.

In an embodiment, the terminal may obtain the signal strengths of the cells in the list of the candidate cells, and sort the cells in the list of the candidate cells based on a priority and a signal strength of a to-be-dwelled cell, and obtain the sorted list of the candidate cells.

Specifically, the terminal may pre-set multiple priority levels, and set the highest priority for the to-be-dwelled cell. The terminal may sort the cells in the list of the candidate cells based on a descending sequence of the priority levels. Subsequently, the terminal may sort the cells in each of the priority levels based on the descending sequence of the signal strengths. In this way, the terminal completes a process of sorting the cells in the list of the candidate cells based on the priority and the signal strength of the to-be-dwelled cell.

For example, the terminal may set seven priority levels of 1-7 for the list of the candidate cells. The terminal may set a priority level of the to-be-dwelled cell to be 7, sort the cells in the list of the candidate cells based on a sequence of the priority level from 7 to 1, and then sort the cells in each of the priority levels based on the descending sequence of the signal strengths. In this way, the process of sorting the cells in the list of the candidate cells based on the priority and the signal strength of the to-be-dwelled cell may be achieved.

In another embodiment, the terminal may also add a preset offset to the signal strength of the to-be-dwelled cell, so as to improve the priority of the to-be-dwelled cell in the list of the candidate cells. Subsequently, the terminal may re-sort the cells in the list of the candidate cells and obtain the sorted list of the candidate cells.

In the embodiments of the present disclosure, the terminal may search for the target cell having the highest priority from the sorted list of the candidate cells and dwell on the target cell.

In the embodiments of the present disclosure, in the NAS networking, for the terminal supporting an EN-DC dual connection, the terminal may display a 5G icon on the display interface, activate the 5G modem, and prepare to receive an instruction of the network to further establish a 5G NR SCG (Secondary Cell Group).

Further, after the terminal selects the target cell and dwell on the target cell, the terminal may update the pre-stored cells by the target cell.

Specifically, the terminal may determine whether the target cell matches the historical anchor cells in the pre-stored cells. When the target cell does not match the historical anchor cells, the terminal may add the target cell to the historical anchor cells.

In an embodiment, the terminal may store a target NSA anchor cell to an ACQ_DB(NSA) file in the EFS.

It can be understood that the terminal pre-stores the pre-stored cells configured to access the first network. When performing the frequency-scanning process, the terminal may prioritize to search for the frequency points of the pre-stored cells so as to determine the first-type cells which may be available to be dwelled on in this process. In the subsequence, the terminal may increase the priorities of the first-type cells in the list of the candidate cells obtained after the frequency-scanning process. The priorities of the first-type cells configured to access the first network are improved, such that when the terminal requires to dwell on the first network (i.e., a NSA anchor network), the terminal may prioritize to select the first-type cells. In this way, a successful possibility of the terminal dwelling on the NSA anchor network may be improved, such that the flexibility of dwelling on the cells may be improved.

A Second Embodiment

Another cell dwelling method is provided in some embodiments of the present disclosure, as shown in FIG. 2, and the method may include the following.

At block S201, searching, by the terminal, for frequency points of pre-stored cells, and determining first-type cells from the pre-stored cells. The pre-stored cells and the first-type cells are preset anchor cells configured to access a first network, and the first-type cells are the preset anchor cells determined by performing a frequency-scanning process for the pre-stored cells.

The cell dwelling method provided in some embodiments of the present disclosure is applicable for the scenario in which the terminal performs the frequency-scanning process and prioritizes the NSA anchor cell to dwell on during the initial access.

In the embodiments of the present disclosure, the terminal may acquire the pre-configured anchor cells for accessing the first network and the frequency-point information of the pre-configured anchor cells, and add the pre-configured anchor cells and the frequency-point information of the pre-configured anchor cells to the pre-stored cells.

In the embodiments of the present disclosure, the terminal may acquire the historical anchor cells which have historically accessed the first network and the frequency-point information of the historical anchor cells, and add the historical anchor cells and the frequency-point information of the historical anchor cells to the pre-stored cells.

In the embodiments of the present disclosure, the pre-stored cells may be stored in the EFS of the terminal.

In the embodiments of the present disclosure, the first network may be the 5G network, and the pre-stored cells may be the NSA anchor cells.

In the embodiments of the present disclosure, the cells in the pre-stored cells may include the pre-configured anchor cells and the historical anchor cells, such that the terminal may search for the frequency points of the pre-stored cells based on the preset frequency-scanning sequence for the pre-configured anchor cells and the historical anchor cells.

At block S202, performing, by the terminal, the frequency-scanning process and receiving the system message of the first cell, and parsing the system message. The first cell is any one of the frequency-scanning cells.

After the terminal determines the first-type cells from the pre-stored cells, the terminal may perform the frequency-scanning process, and parse the system message in response to receiving the system message of the first cell after the frequency-scanning process.

In the actual applications, when the system message is SIB2, the base station may broadcast the SIB2 to the terminal. The terminal may perform the frequency-scanning process and receive the SIB2, and parse the fields contained in the system message.

At block S203, adding, by the terminal, the first cell to the first-type cells in response to the target field being parsed from the system message. The target field is configured to indicate an anchor cell accessing the first network.

After the terminal parses the system message of the first cell, when parsing the target field from the system message, the terminal may add the first cell to the first-type cells.

In the embodiments of this present disclosure, the target field may be the upperLayerIndication-r15, which is the field extended from the LTE cell for the form of the NSA networking and configured to indicate whether the cell is the NSA anchor cell supporting 5G. The terminal may parse the SIB2. When parsing the upperLayerindication-r15 from the SIB2, the terminal determines that the first cell is the NSA anchor cell. In this case, the terminal may add the first cell to the first-type cells.

At block S204, determining, by the terminal, the first cell is of the second-type cells in response to the target field being not parsed from the system message. The second-type cells are cells configured to access networks different from the first network.

After the terminal parses the system message of the first cell, when not parsing the target field from the system message, the terminal may determine the first cell is of the second-type cells.

At block 205, combining, by the terminal, the first-type cells and second-type cells to be the frequency-scanning cells.

After the terminal obtains the first-type cells and the second-type cells, the terminal may combine the first-type cells and the second-type cells to be the frequency-scanning cells.

It should be noted that the terminal may pre-configure the frequency-band information corresponding to the first network. During the terminal performing the frequency-scanning process, the terminal may perform the frequency-scanning process according to the frequency-band information corresponding to the first network and obtain the frequency-scanning cells. In this way, the accuracy and the efficiency of the terminal obtaining the NSA anchor cell after performing the frequency-scanning process in the frequency-scanning process may be improved.

In the embodiments of the present disclosure, the frequency-scanning cells may include the NSA anchor cells and the LTE cells, which may be specifically selected according to the actual situations and not specifically limited in the embodiments of the present disclosure.

It should be noted that, the block S203 and the block S204 are two parallel operations before the block S205, which may be specifically selected according to the actual situations and not specifically limited in the embodiments of the present disclosure.

At block 206, adding, by the terminal, the frequency-scanning cells to the list of the candidate cells. The frequency-scanning cells include the first-type cells, and the frequency-scanning cells in the list of the candidate cells are sorted based on the preset sorting rule.

After the terminal acquire the frequency-scanning cells, the terminal may add the frequency-scanning cells to the list of the candidate cells.

At block 207, increasing, by the terminal, the priorities of the first-type cells in the list of the candidate cells.

After the terminal adds the frequency-scanning cells to the list of the candidate cells, the terminal may increase the priorities of the first-type cells in the list of the candidate cells.

At block 208, sorting, by the terminal, the frequency-scanning cells in the list of the candidate cells based on the priorities of the first-type cells, and obtaining the sorted list of the candidate cells.

After the terminal increase the priorities of the first-type cells in the list of the candidate cells, the terminal may sort the frequency-scanning cells in the list of the candidate cells based on the priorities of the first-type cells, and obtain the sorted list of the candidate cells.

At block 209, selecting, by the terminal, the target cell having the high priority from the sorted list of the candidate cells, and dwelling on the target cell.

After the terminal sorts the frequency-scanning cells in the list of the candidate cells based on the priorities of the first-type cells and obtains the sorted list of the candidate cells, the terminal may select the target cell having the high priority from the sorted list of the candidate cells, and dwell on the target cell.

At block 210, updating, by the terminal, the pre-stored cells by the target cell.

After the terminal selects the target cell having the high priority from the sorted list of the candidate cells and dwells on the target cell, the terminal may update the pre-stored cells by the target cell.

It can be understood that the terminal pre-stores the pre-stored cells configured to access the first network. When performing the frequency-scanning process, the terminal may prioritize to search for the frequency points of the pre-stored cells so as to determine the first-type cells which may be available to be dwelled on in this process. In the subsequence, the terminal may increase the priorities of the first-type cells in the list of the candidate cells obtained after the frequency-scanning process. Furthermore, in the frequency-scanning process, the terminal may determine whether the anchor cell for accessing the first network exist in the frequency-scanning cells through parsing the system message of the cell obtained after the frequency-scanning process, and add the anchor cell to the first-type cells. The priorities of the first-type cells configured to access the first network are improved, such that when the terminal requires to dwell on the first network (i.e., a NSA anchor network), the terminal may prioritize to select the first-type cells. In this way, the successful possibility of the terminal dwelling on the NSA anchor network may be improved, such that the flexibility of dwelling on the cells may be improved.

A Third Embodiment 3

Figure 3:
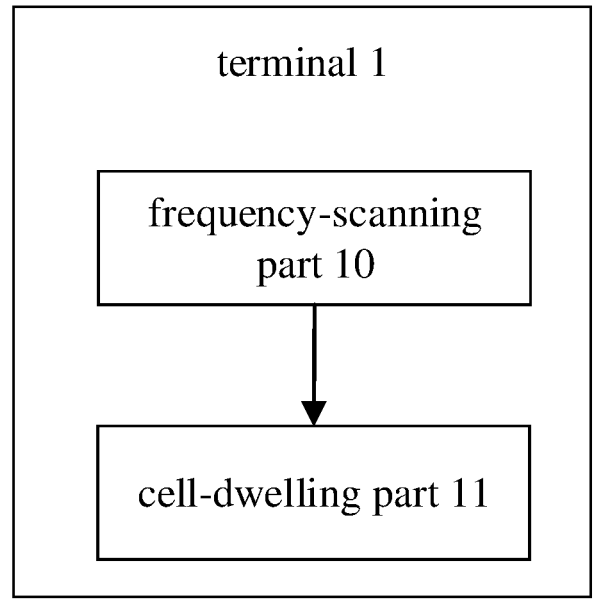
FIG. 3 is a structural schematic view of a terminal according to some embodiments of the present disclosure.

A terminal 1 is provided in the embodiments of the present disclosure. As shown in FIG. 3, the terminal 1 may include the following.

A frequency-scanning part 10 may be configured to search for the frequency points of pre-stored cells, and determine the first-type cells from the pre-stored cells, the pre-stored cells and the first-type cells being the preset anchor cells configured to access the first network, and the first-type cells being the preset anchor cells determined by performing the frequency-scanning process for the pre-stored cells; and perform another frequency-scanning process and obtain the frequency-scanning cells, and add the frequency-scanning cells to the list of candidate cells. The frequency-scanning cells include the first-type cells, and the frequency-scanning cells in the list of the candidate cells are sorted based on the preset sorting rule.

A cell-dwelling part 11 may be configured to increase priorities of the first-type cells in the list of the candidate cells, select the target cell of the first-type cells from the list of the candidate cells based on the priorities, and dwell on the target cell.

In some embodiments, the terminal may further include a receiving part, a parsing part, and an adding part.

The receiving part may be configured to perform the frequency-scanning process and receive the system message of the first cell.

The parsing part may be configured to parse the system message. The first cell is any one of the frequency-scanning cells.

The adding part may be configured to add the first cell to the first-type cells in response to the target field being parsed from the system message, the target field being configured to indicate the anchor cell accessing the first network; determine the first cell is of second-type cells in response to the target field being not parsed from the system message, the second-type cells being cells configured to access networks different from the first network; and combine the first-type cells and second-type cells to be the frequency-scanning cells.

In some embodiments, the terminal may further include an acquiring part.

The acquiring part may be configured to acquire the pre-configured anchor cells for accessing the first network and the frequency-point information of the pre-configured anchor cells.

The adding part may further be configured to add the pre-configured anchor cells and the frequency-point information of the pre-configured anchor cells to the pre-stored cells.

In some embodiments, the acquiring part is further configured to acquire the historical anchor cells that have historically accessed the first network and the frequency-point information of the historical anchor cells.

The adding part is further configured to add the historical anchor cells and the frequency-point information of the historical anchor cells to the pre-stored cells.

In some embodiments, the frequency-scanning part 10 may be further configured to search for the frequency points of the pre-stored cells according to the preset frequency-scanning sequence.

In some embodiments, the terminal may further include a configuration part.

The configuration part may be configured to configure the frequency-band information corresponding to the first network.

The frequency-scanning part 10 may be further configured to perform the frequency-scanning process according to the frequency-band information corresponding to the first network, and obtain the frequency-scanning cells.

In some embodiments, the terminal may further include a sorting part.

The sorting part may be configured to sort the frequency-scanning cells in the list of the candidate cells based on the priorities of the first-type cells and obtain the sorted list of the candidate cells.

The cell-dwelling part 11 may be further configured to select the target cell having the high priority from the sorted list of the candidate cells and dwell on the target cell.

In some embodiments, the terminal may further include an updating part.

The updating part may be configured to update the pre-stored cells by the target cell.

The terminal is provided in the embodiments of the present disclosure. The terminal is configured to search for the frequency points of the pre-stored cells, and determine the first-type cells from the pre-stored cells, the pre-stored cells and the first-type cells being the preset anchor cells configured to access the first network, and the first-type cells being the preset anchor cells determined by performing the frequency-scanning process for the pre-stored cells; perform another frequency-scanning process and obtain the frequency-scanning cells, and add the frequency-scanning cells to the list of candidate cells; the frequency-scanning cells including the first-type cells, and the frequency-scanning cells in the list of the candidate cells being sorted based on the preset sorting rule; and increase the priorities of the first-type cells in the list of the candidate cells, select the target cell of the first-type cells from the list of the candidate cells based on the priorities, and dwell on the target cell. It can be seen that the terminal provided in the embodiments of the present disclosure may pre-store the pre-stored cells configured to access the first network. When performing the frequency-scanning process, the terminal may prioritize to search for the frequency points of the pre-stored cells so as to determine the first-type cells which may be available to be dwelled on in this process. In the subsequence, the terminal may increase the priorities of the first-type cells in the list of the candidate cells obtained after the frequency-scanning process. The priorities of the first-type cells configured to access the first network are improved, such that when the terminal requires to dwell on the first network (i.e., the NSA anchor network), the terminal may prioritize to select the first-type cells. In this way, the successful possibility of the terminal dwelling on the NSA anchor network may be improved, such that the flexibility of dwelling on the cells may be improved.

Figure 4:
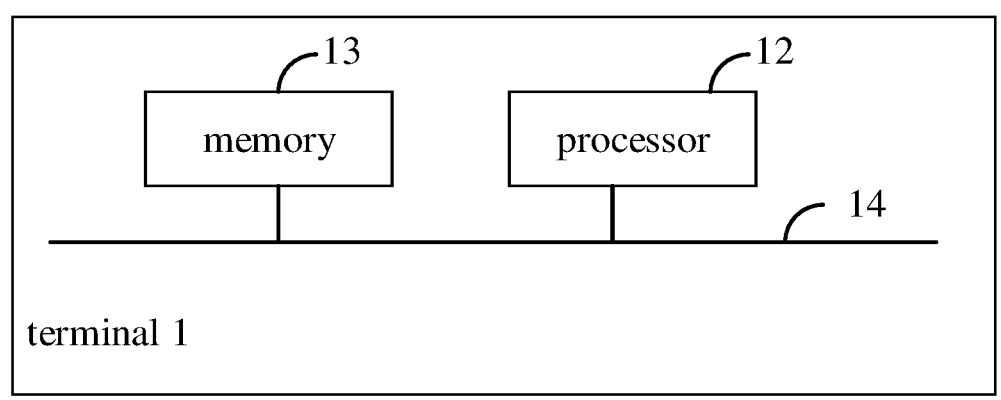
FIG. 4 is a structural schematic view of another terminal according to some embodiments of the present disclosure.

FIG. 4 is a structural schematic view of another terminal 1 according to some embodiments of the present disclosure. In the actual applications, based on the same disclosed concept with the above-mentioned embodiments, as shown in FIG. 4, the terminal 1 in the present embodiment may include a processor 12, a memory 13, and a communication bus 14.

In a process of the specific embodiments, the frequency-scanning part 10, the cell-dwelling part 11, the receiving part, the parsing part, the adding part, the acquiring part, the configuration part, the sorting part, and updating part may be implemented by the processor 12 in the terminal 1. The processor 12 may be at least one of an ASIC (Application Specific Integrated Circuit), a DSP (Digital Signal Processor), a DSPD (Digital Signal Processing Device), or a PLD (Programmable Logic Device), a FPGA (Field Programmable Gate Array), a CPU, a controller, a microcontroller, and a microprocessor. It can be understood that, for different devices, functions of the processor mentioned above may be implemented by other electronic components, which will not be specifically limited in the present embodiment.

In the embodiments of the present disclosure, the communication bus 14 may be configured to achieve a connection communication between the processor 12 and the memory 13. When the processor 12 executes operating programs stored in the memory 13, the cell dwelling method described in the first embodiment and the second embodiment may be implemented.

A non-transitory computer storage medium is provided in the embodiments of the present disclosure and configured to store computer programs. A non-transitory computer storage medium mentioned above may store one or more programs which may be executed by one or more processors and applied in the terminal. The computer programs may be configured to implement the cell dwelling method described in the first embodiment.

The above descriptions are only some embodiments of the present disclosure, and are not intended to limit a protection scope of the present disclosure.

INDUSTRIAL APPLICABILITY

The cell dwelling method, a terminal, and a non-transitory storage medium are provided in the embodiments of the present disclosure. The method includes searching for the frequency points of the pre-stored cells, and determining the first-type cells from the pre-stored cells, the pre-stored cells and the first-type cells being the preset anchor cells configured to access the first network, and the first-type cells are the preset anchor cells determined by performing the frequency-scanning process for the pre-stored cells; performing another frequency-scanning process and obtaining frequency-scanning cells, and adding the frequency-scanning cells to the list of the candidate cells; the frequency-scanning cells including the first-type cells, and the frequency-scanning cells in the list of the candidate cells being sorted based on the preset sorting rule; and increasing the priorities of the first-type cells in the list of the candidate cells, selecting the target cell of the first-type cells from the list of the candidate cells based on the priorities, and dwelling on the target cell. With an implementation solution described above, the terminal may pre-store the pre-stored cells configured to access the first network. When performing the frequency-scanning process, the terminal may prioritize to search for the frequency points of the pre-stored cells so as to determine the first-type cells which may be available to be dwelled on in this process. In the subsequence, the terminal may increase the priorities of the first-type cells in the list of the candidate cells obtained after the frequency-scanning process. The priorities of the first-type cells configured to access the first network are improved, such that when the terminal requires to dwell on the first network (i.e., the NSA anchor network), the terminal may prioritize to select the first-type cells. In this way, the flexibility of dwelling on the cells may be improved.

What is claimed is:

1. A cell dwelling method, comprising:
searching for frequency points of pre-stored cells, and determining first-type cells from the pre-stored cells, wherein the pre-stored cells and the first-type cells are preset anchor cells configured to access a first network, and the first-type cells are the preset anchor cells determined by performing a frequency-scanning process for the pre-stored cells;
performing another frequency-scanning process and obtaining frequency-scanning cells, and adding the frequency-scanning cells to a list of candidate cells; wherein the frequency-scanning cells comprises the first-type cells, and the frequency-scanning cells in the list of the candidate cells are sorted based on a preset sorting rule; and
increasing priorities of the first-type cells in the list of the candidate cells, selecting a target cell of the first-type cells from the list of the candidate cells based on the priorities, and dwelling on the target cell;
wherein before searching for frequency points of pre-stored cells:
acquiring pre-configured anchor cells for accessing the first network and frequency-point information of the pre-configured anchor cells; and
adding the pre-configured anchor cells and the frequency-point information of the pre-configured anchor cells to the pre-stored cells; or
before searching for frequency points of pre-stored cells:
acquiring historical anchor cells which have historically accessed the first network and frequency-point information of the historical anchor cells; and
adding the historical anchor cells and the frequency-point information of the historical anchor cells to the pre-stored cells.

2. The method according to claim 1, wherein the performing another frequency-scanning process and obtaining frequency-scanning cells, comprises:
performing the frequency-scanning process and receiving a system message of a first cell, and parsing the system message; wherein the first cell is any one of the frequency-scanning cells;
adding the first cell to the first-type cells in response to a target field being parsed from the system message, wherein the target field is configured to indicate an anchor cell accessing the first network;
determining the first cell is of second-type cells in response to the target field being not parsed from the system message, wherein the second-type cells are cells configured to access networks different from the first network; and
combining the first-type cells and second-type cells to be the frequency-scanning cells.

3. The method according to claim 1, wherein the searching for frequency points of pre-stored cells, comprises:
searching for the frequency points of the pre-stored cells according to a preset frequency-scanning sequence.

4. The method according to claim 1, wherein the performing another frequency-scanning process and obtaining frequency-scanning cells, comprises:
configuring frequency-band information corresponding to the first network; and
performing the frequency-scanning process according to frequency-point information corresponding to the first network, and obtaining the frequency-scanning cells.

5. The method according to claim 1, wherein the selecting a target cell of the first-type cells from the list of the candidate cells based on the priorities, and dwelling on the target cell, comprises:
sorting the frequency-scanning cells in the list of the candidate cells based on the priorities of the first-type cells, and obtaining a sorted list of the candidate cells; and
selecting the target cell having a high priority from the sorted list of the candidate cells, and dwelling on the target cell.

6. The method according to claim 1, further comprising:
after selecting the target cell of the first-type cells from the list of the candidate cells based on the priorities, and dwelling on the target cell, updating the pre-stored cells by the target cell.

7. A terminal, wherein the terminal comprises:
a processor;
a memory; and
a communication bus;
wherein when executing operating programs stored in the memory, the processor is configured to implement:
searching for frequency points of pre-stored cells, and determining first-type cells from the pre-stored cells, wherein the pre-stored cells and the first-type cells are preset anchor cells configured to access a first network, and the first-type cells are the preset anchor cells determined by performing a frequency-scanning process for the pre-stored cells;
performing another frequency-scanning process and obtaining frequency-scanning cells, and adding the frequency-scanning cells to a list of candidate cells; wherein the frequency-scanning cells comprises the first-type cells, and the frequency-scanning cells in the list of the candidate cells are sorted based on a preset sorting rule; and
increasing priorities of the first-type cells in the list of the candidate cells, selecting a target cell of the first-type cells from the list of the candidate cells based on the priorities, and dwelling on the target cell;
wherein the processor is further configured to implement:
before searching for frequency points of pre-stored cells:
acquiring pre-configured anchor cells for accessing the first network and frequency-point information of the pre-configured anchor cells; and
adding the pre-configured anchor cells and the frequency-point information of the pre-configured anchor cells to the pre-stored cells; or
before searching for frequency points of pre-stored cells:
acquiring historical anchor cells which have historically accessed the first network and frequency-point information of the historical anchor cells; and
adding the historical anchor cells and the frequency-point information of the historical anchor cells to the pre-stored cells.

8. The terminal according to claim 7, wherein in the performing another frequency-scanning process and obtaining frequency-scanning cells, the processor is configured to implement:
performing the frequency-scanning process and receive a system message of a first cell, and parsing the system message; wherein the first cell is any one of the frequency-scanning cells;

adding the first cell to the first-type cells in response to a target field being parsed from the system message, wherein the target field is configured to indicate an anchor cell accessing the first network;

determining the first cell is of second-type cells in response to the target field being not parsed from the system message, wherein the second-type cells are cells configured to access networks different from the first network; and combining the first-type cells and second-type cells to be the frequency-scanning cells.

9. The terminal according to claim 7, wherein in the searching for frequency points of pre-stored cells, the processor is further configured to implement:

searching for the frequency points of the pre-stored cells according to a preset frequency-scanning sequence.

10. The terminal according to claim 7, wherein in the performing another frequency-scanning process and obtaining frequency-scanning cells, the processor is further configured to implement:

configuring frequency-band information corresponding to the first network; and performing the frequency-scanning process according to frequency-point information corresponding to the first network, and obtaining the frequency-scanning cells.

11. The terminal according to claim 7, wherein in the selecting a target cell of the first-type cells from the list of the candidate cells based on the priorities, and dwelling on the target cell, the processor is further configured to implement:

sorting the frequency-scanning cells in the list of the candidate cells based on the priorities of the first-type cells, and obtaining a sorted list of the candidate cells; and selecting the target cell having a high priority from the sorted list of the candidate cells, and dwelling on the target cell.

12. The terminal according to claim 7, wherein the processor is further configured to implement:

after selecting the target cell of the first-type cells from the list of the candidate cells based on the priorities, and dwelling on the target cell, updating the pre-stored cells by the target cell.

13. A non-transitory storage medium applied for a terminal, storing computer programs, wherein when the computer programs are executed by a processor, the processor is caused to implement:

searching for frequency points of pre-stored cells, and determining first-type cells from the pre-stored cells, wherein the pre-stored cells and the first-type cells are preset anchor cells configured to access a first network, and the first-type cells are the preset anchor cells determined by performing a frequency-scanning process for the pre-stored cells;

performing another frequency-scanning process and obtaining frequency-scanning cells, and adding the frequency-scanning cells to a list of candidate cells; wherein the frequency-scanning cells comprises the first-type cells, and the frequency-scanning cells in the list of the candidate cells are sorted based on a preset sorting rule; and increasing priorities of the first-type cells in the list of the candidate cells, selecting a target cell of the first-type cells from the list of the candidate cells based on the priorities, and dwelling on the target cell;

wherein the processor is further configured to implement:

before searching for frequency points of pre-stored cells:

acquiring pre-configured anchor cells for accessing the first network and frequency-point information of the pre-configured anchor cells; and adding the pre-configured anchor cells and the frequency-point information of the pre-configured anchor cells to the pre-stored cells; or before searching for frequency points of pre-stored cells:

acquiring historical anchor cells which have historically accessed the first network and frequency-point information of the historical anchor cells; and adding the historical anchor cells and the frequency-point information of the historical anchor cells to the pre-stored cells.

14. The non-transitory storage medium according to claim 13, wherein in the performing another frequency-scanning process and obtaining frequency-scanning cells, the processor is configured to implement:

performing the frequency-scanning process and receive a system message of a first cell, and parsing the system message; wherein the first cell is any one of the frequency-scanning cells;

adding the first cell to the first-type cells in response to a target field being parsed from the system message, wherein the target field is configured to indicate an anchor cell accessing the first network;

determining the first cell is of second-type cells in response to the target field being not parsed from the system message, wherein the second-type cells are cells configured to access networks different from the first network; and combining the first-type cells and second-type cells to be the frequency-scanning cells.

* * * * *